United States Patent
Haberer et al.

(10) Patent No.: US 6,958,465 B2
(45) Date of Patent: Oct. 25, 2005

(54) METHOD FOR DETECTING OBJECTS AND LIGHT BARRIER GRID

(75) Inventors: Manfred Haberer, Riegel (DE); Thomas Staehler, Limburg (DE)

(73) Assignee: Sick AG, Waldkirch/Breisgau (DE)

( * ) Notice: Subject to any disclaimer, the term of this patent is extended or adjusted under 35 U.S.C. 154(b) by 390 days.

(21) Appl. No.: 10/412,613

(22) Filed: Apr. 10, 2003

(65) Prior Publication Data

US 2003/0218122 A1    Nov. 27, 2003

(30) Foreign Application Priority Data

Apr. 12, 2002  (DE) ................................ 102 16 122

(51) Int. Cl.[7] ............................................... G01V 9/04
(52) U.S. Cl. .................... 250/221; 356/627; 356/634; 209/586
(58) Field of Search ................. 356/627, 634; 250/221, 559.24, 559.26; 209/586

(56) References Cited

U.S. PATENT DOCUMENTS

| | | | | |
|---|---|---|---|---|
| 3,327,850 A | * | 6/1967 | Simmons ..................... | 209/586 |
| 4,384,201 A | | 5/1983 | Carroll et al. | |
| 5,281,809 A | * | 1/1994 | Anderson et al. ........... | 250/221 |
| 5,768,327 A | | 6/1998 | Pinto et al. | |
| 6,737,970 B2 | * | 5/2004 | Wuestefeld et al. ........ | 340/552 |
| 2002/0047633 A1 | * | 4/2002 | Jurs et al. .................... | 315/291 |

FOREIGN PATENT DOCUMENTS

| | | |
|---|---|---|
| DE | 91 14 867 U1 | 3/1992 |
| DE | 42 01 116 A1 | 7/1993 |
| DE | 44 22 497 A1 | 1/1996 |
| DE | 44 22 497 C2 | 1/1996 |
| DE | 44 24 537 A1 | 1/1996 |
| DE | 196 04 900 C2 | 8/1997 |
| DE | 201 03 828 U1 | 7/2001 |
| DE | 100 33 077 A1 | 1/2002 |
| EP | 1 089 030 A2 | 4/2001 |

* cited by examiner

*Primary Examiner*—Richard A. Rosenberger
(74) *Attorney, Agent, or Firm*—Townsend and Townsend and Crew LLP

(57) ABSTRACT

A method for monitoring two or more movable objects in a monitoring region. A substantially horizontal light barrier grid having a plurality of parallel light barriers monitors the region. To permit a plurality of objects to simultaneously move in the monitored region without deactivating the monitoring function of the system, the system controls an entry area for the objects, the size of the objects as well as the distance between the objects to ascertain that predetermined criteria therefor are met. If one or more of these criteria is not met, a control signal is generated which can be used, for example, to deactivate the machinery and/or prevent access to the monitored region.

12 Claims, 2 Drawing Sheets

METHOD FOR DETECTING OBJECTS AND LIGHT BARRIER GRID

BACKGROUND OF THE INVENTION

The present invention relates to a method for identifying two or more movable objects in an observation or monitoring area with an essentially horizontal light grid that has a plurality of parallel light barriers and a light barrier for practicing the method.

Light grids are used, for example, to control highly automated manufacturing systems or assembly lines, such as in the automotive industry, where workpieces are automatically fed to a workstation, worked on and then transported away. Such assembly or manufacturing lines typically have fully automated workstations (for example robot installations) and associated transportation and supply systems. These supply systems and/or the workstations where work is being performed present zones of potential danger for workers which require protection against unwanted intrusions. The desired protection can be provided with light barrier grids of the type described above.

The word "light" as used herein is not limited to visible light and is intended to encompass light of all types, including particularly all types of ultraviolet light, infrared light, as well as visible light.

Access areas and transfer locations for materials to dangerous rooms, for example robot stations or other machines, are conventionally protected by so-called muting systems. Light barriers are employed, for example, to monitor the entry of persons, and they can be temporarily deactivated or muted when material is being delivered. German patent publication DE 201 03 828 U1, for example, describes such a system. Known muting systems are costly to install and to operate, which is a disadvantage. A particular disadvantage of such systems is that under muting conditions the control function is completely blocked, and during such times the control of access to the dangerous area is deactivated. The emitters and receivers of light barrier grids of muting systems must be constructed so that no person can enter the danger zone through the space between the sensors and the muting object. The space between the sensors is therefore typically secured with swinging doors.

German patent publication DE 44 24 537 discloses a system in which a light barrier grid recognizes objects as so-called floating blanking objects by monitoring for predetermined sizes and positions of the objects. Such systems are limited to monitoring objects within certain size and position ranges. It is therefore not possible to have two or more objects of predefined but differing size and spacing (from each other) simultaneously within the light barrier grid without deactivating the system.

As a result, prior art systems of the type described above encounter the problem of differentiating between permitted objects (for example machine components) and impermissible objects (for example the legs of a person) in the area being monitored.

BRIEF SUMMARY OF THE INVENTION

In view of the foregoing, it is an object of the present invention to provide a method for detecting objects with a light barrier grid of the type described above in which a plurality of objects can simultaneously move inside the monitored area without deactivating the control function of the system. This is achieved by a combination of monitoring the entry area for the objects, the size of the objects, and the distance or distances between the objects to ascertain that they are within acceptable limits. When one or more of these criteria is not met, a control signal is generated.

Objects are recognized in accordance with the invention by employing an evaluation algorithm that makes use of the three criteria and which decides if the object is an object that is permitted or prohibited in the monitored region. To identify the object as being a permitted object, the entry area must always be activated. For example, when an object, say the leg of a person instead of the support of a material transport vehicle, initially enters the protected entry area, it is recognized and the monitored machine is deactivated. A configuration tool is used to configure the light barrier grid so that it recognizes objects in the entry area as well as the maximum size of the objects and respective distances from each other when two or more objects are simultaneously in the protected space. The light barrier grid continuously checks if the objects that might be present in the protected space are valid or permitted objects. When a new object is recognized, it is further checked if the object entered through the predefined entry areas. If, as described, an object enters the protected space through a different area, if it has an unacceptable size, or if the distance between a plurality of objects is outside an acceptable range, the machine is immediately deactivated.

The control system of the present invention has many advantages. One particular advantage is that with the present invention it is for the first time possible to permit a plurality of permitted objects in the protected space even while they move through the space. In addition, the system of the present invention is simple to assemble, install and configure. It requires relatively few components because multiple sensors as disclosed, for example, in the system of DE 201 03 828 U1 are not required. Further, a permanent control of the protected space is possible even when permitted objects are in the protected space. For example, a person cannot simultaneously traverse the protected space while a permitted material transport vehicle is in it. This results in a better protection of the danger zone. Further, extra swinging doors are not needed. Also, the system cannot impermissibly be manipulated because the light barrier grid is active at all times.

In addition to the above-mentioned three criteria, in another embodiment of the invention the number of objects can be monitored. This is advantageous, for example, when the same type of material transport system always passes through the light barrier grid, as can be encountered in the automotive industry. The protection is advantageously enhanced when the order of the objects being monitored is used as an additional criterion.

In another embodiment of the invention, the actual object movements through the light barrier grid are compared with stored patterns of permissible object movements.

It is also possible to monitor whether a second object enters the protected space with a predetermined distance from the first object.

Additionally, the entry area can be controlled with one or more light barriers.

The entry area for the object can further be placed at a desired location such as the beginning, the end or even in a middle portion of the light barrier grid.

In accordance with a particularly advantageous embodiment of the invention, the monitored criteria are taught and learned during a learning phase for the system. For this, a software or hardware control switch places the light barrier in a learning state or mode and, after the criteria have been learned, the system is returned to its normal operating state.

Returning the system to its normal operating state can also occur automatically, for example after a preestablished number of objects has traversed the light barrier. This simplifies the operation and setting of the light barrier.

The present invention further includes an apparatus to practice the above-summarized monitoring method. Such apparatus has a light grid with a light emitting bar that has a number of adjacent light emitters arranged in a row, and a light receiving bar which has light receptors that are assigned to corresponding light transmitters and arranged next to each other to form a multitude of parallel light barriers. The light barrier grid has at least one control and evaluation unit which controls and evaluates the individual light barriers and which generates a warning signal upon the interruption of one or more light barriers by an object. The control and evaluation unit is arranged so that the interruption of one light barrier within a predetermined space or area does not generate a warning signal to maintain and continue the protecting function. In accordance with the invention, the interruption of a light barrier leads to generating a warning signal only if one or more of the following three criteria is not met, namely a predetermined entry area for the objects is not met
the objects do not fall within a predetermined size range
the distance or distances between the objects is outside a predetermined range.

The advantages of such a light barrier grid have already been described above in connection with the method of the present invention.

In one embodiment of the invention the light emitting bar and the light receiving bar each has its own control and evaluation unit. By optically synchronizing the light emitting and light receiving bars, as is described, for example, in DE 38 03 033 A1, no electric connection between the two bars is necessary, which renders the system more versatile and simpler to design.

By incorporating the control and evaluation unit in the light emitting and/or light receiving bars, the need for an additional unit is eliminated and the entire functionality of the system is integrated into the light barrier grid.

To eliminate the need for laboriously programming the control criteria, another embodiment of the invention contemplates to provide the control and evaluation unit with means to place the light barrier grid into the learning status. Such means can be a switch or software commands.

To further simplify the setup and adjustment of the system, the present invention activates the learning phase for the system so that after a predetermined number of objects has traversed the light barrier grid the grid is automatically switched from the learning state to its normal operating state.

DESCRIPTION OF THE PREFERRED EMBODIMENTS

Figure 1:
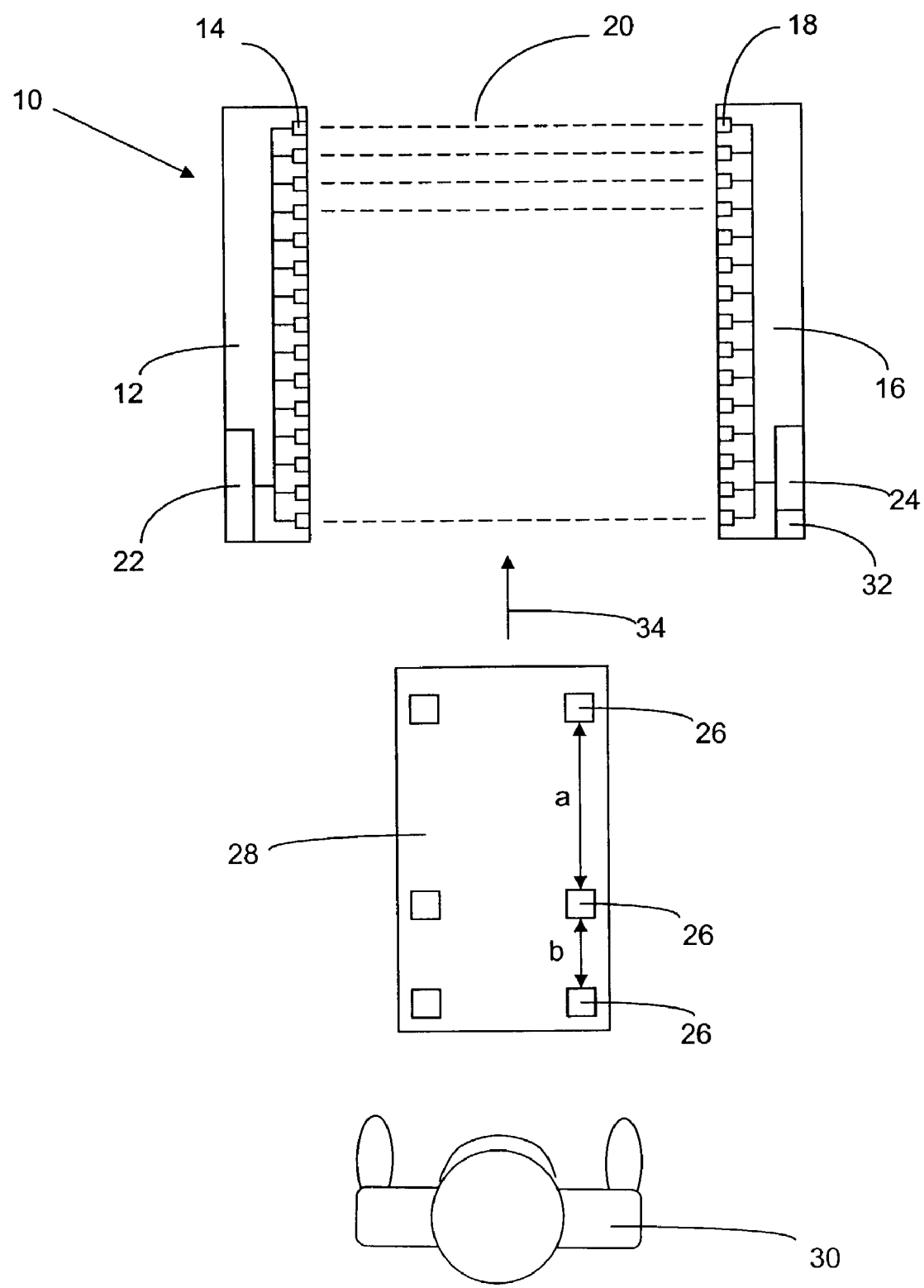
FIG. 1 is a plan view of the light barrier grid of the present invention and illustrates its use at a protected space.
Figure 2:
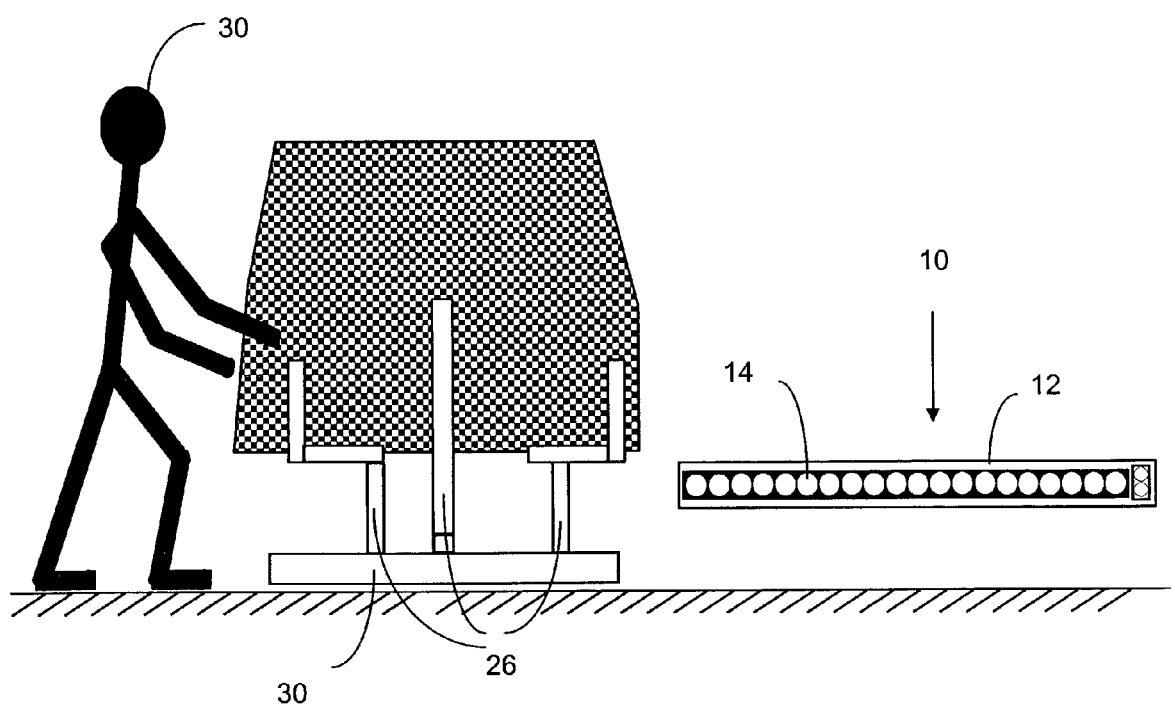
FIG. 2 is a side elevation of the system of the present invention and shows an area protected by the light barrier grid for purposes of explaining the method of the present invention.

The light barrier grid 10 of the present invention has a light emitting bar 12 which mounts a number of adjacent light emitters arranged in a row. A light receiving bar 16 has light receptors 18 which correspond to light emitters 14 and which are also arranged next to each other. Respective opposing light emitters 14 and light receptors 18 define a multitude of parallel light barriers 20 in a generally known manner. The light beams between the emitters and the receptors are shown in phantom lines in FIG. 1.

Thus, light barrier grid 10 with its light barriers 20 defines a control area with a protected space between light emitting bar 12 and light receiving bar 16. In the illustrated embodiment, the light emitting bar 12 and the light receiving bar 16 each have a control and evaluation unit 22, 24. Control and evaluation unit 22 controls the individual light emitters 14 of emitting bar 12, and control and evaluation unit 24 of the receiving bar controls light receptors 18 and evaluates their outputs so that, upon the interruption of one or more light barriers 20 by an object, a warning signal is generated by control and evaluation unit 24. This output can also be used as a signal for deactivating dangerous machinery.

The general function of such a light barrier grid is described, for example, in DE 38 03 033 A1. The individual light barriers 20 of light barrier grid 10 are cyclically and serially activated. The light emitters 14 and light receptors 18 are optically synchronized, for example via the first and/or last light barrier, so that at all times the light receptor opposite the momentarily emitting light emitter is activated. This eliminates the need for an electric connection between emitting bar 12 and receiving bar 16.

Control and evaluation unit 24 is configured in accordance with the present invention so that the interruption of a light barrier 20 leads to the generation of a warning signal only if one of the following three criteria is not met the objects do not enter through a predetermined entry area
the objects are not of a predetermined size or size range
the distance or distances between the objects is not within a predetermined range or does not have a predetermined value.

In this manner, the light barrier grid can distinguish between permitted and not permitted objects in the space being monitored. A permitted object can, for example, be the three struts 26 of a transport unit 28. A not permitted object could be a person 30 shown in the drawings.

The method of the present invention and the functioning of the light barrier grid of the present invention are as follows:

Initially the above-mentioned at least three criteria are programmed into the light barrier grid 10. This can be achieved with the help of a configuration tool, which can be a personal computer with appropriate configuration software. It is particularly preferred, however, to place the light barrier grid in a learning mode during which the mentioned criteria are learned by passing permitted objects, for example transport units 28, through the grid. For placing the grid in the learning mode, the control and evaluation unit 24 has a switch 32 for initiating the learning mode during a learning phase of the control and evaluation unit. During the learning mode, transport unit 28 moves at the normal speed in a transport direction 34 through the protected space. During the learning mode, the maximum size of struts 26 and the two distances "a" and "b" between struts 26, as well as the entry area (in the embodiment shown in FIG. 1 defined by the lowermost light barrier), are learned during the learning mode. In addition, the number of struts, the characteristics of the individual struts, if they are distinguishable, and/or the movement of the object, for example its speed of movement, can be learned as additional criteria. Upon completion of the learning mode, the system is switched to its normal operating mode. The switching can occur automatically if desired.

During normal operation, when the light barrier grid performs its protective function, and when one of the criteria is not met, for example when a person 30 places his leg in the middle of the protected space without being detected in the entry area, that is, when the lowest light barrier in FIG. 1 is traversed but not interrupted, the associated criterion for the entry area is not met and a warning signal is generated and/or a dangerous machine or system is deactivated. If, however, the transport unit with its struts 26 traverses the protected area, it initially enters the entry area of the protected space. This is permitted and does not lead to generating a warning signal or deactivating the machinery. The same applies to the other criteria. For example, the light barrier grid can recognize that the diameter of the leg of the person 30 differs from the cross-section of strut 26 and can distinguish between them. Finally, the distance "a" or "b" between two struts 26 of transport unit 28 is always constant, while the distance between the legs of a person walking through the protected space continuously changes, which can be used to distinguish between permitted and not permitted objects in the protected space and generate a warning signal for the latter but not the former.

What is claimed is:

1. A method for monitoring at least two movable objects in a monitored region comprising arranging a substantially horizontal light barrier grid having a plurality of parallel light barriers in the monitored region, observing the objects in the monitored region, establishing at least three criteria concerning the objects in the region which must be met by the objects to constitute permitted objects, the criteria including an entry area for the objects into the monitored region, a size of the objects, and a distance between the objects, and generating a control signal if at least one of the three criteria is not met by objects in the monitored region.

2. A method according to claim 1 including establishing the number of objects in the monitored region as one of the criteria.

3. A method according to claim 1 including establishing the order in which the objects enter the monitored region as one of the criteria.

4. A method according to claim 1 including establishing and storing as one of the criteria a movement pattern for the object in the monitored region, and comparing a monitored movement of the objects in the monitored region with the stored object movement pattern.

5. A method according to claim 1 including defining the entry area with at least one light barrier.

6. A method according to claim 5 including arranging the entry area at one of a beginning, an end or an intermediate portion of the light barrier grid.

7. A method according to claim 1 including the step of learning the criteria during a learning mode.

8. A light barrier grid comprising a light emitting bar having light emitters arranged next to each other, a light receiving bar including light receptors which cooperate with the light emitters and which are arranged adjacent to each other, cooperating light emitters and light receptors defining a multiplicity of parallel light barriers, and at least one control and evaluation unit for controlling and reading output provided by light barriers, the control and evaluation unit observing as criteria at least an entry area through which the objects enter the monitored region, a size of the objects in the monitored region, and a distance between the objects in the monitored region, the control and evaluation unit comparing the observed criteria with predetermined, stored, values for the corresponding criteria and generating an output signal for controlling potential danger in the monitored region if at least one of the monitored criteria does not correspond to the corresponding stored values therefor.

9. A light barrier grid according to claim 8 including a control and evaluation unit for each of the emitting bar and the receiving bar.

10. A light barrier grid according to claim 9 wherein the control and evaluation unit is integrated into the emitting bar and/or the receiving bar.

11. A light barrier grid according to claim 8 wherein the control and evaluation unit includes a switch for subjecting the light barrier grid to a learning phase during which the light barrier grid learns the criteria.

12. A light barrier grid according to claim 8 wherein the control and evaluation unit learns the criteria by observing a predetermined number of objects traversing the light barrier grid during a learning mode and automatically converts the control and evaluation unit from the learning mode to its normal operating mode upon completion of the learning mode.

* * * * *